(12) United States Patent
Munechika

(10) Patent No.: US 10,202,058 B2
(45) Date of Patent: Feb. 12, 2019

(54) VEHICLE SEAT

(71) Applicant: TOYOTA JIDOSHA KABUSHIKI KAISHA, Toyota-shi, Aichi-ken (JP)

(72) Inventor: Junichi Munechika, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 193 days.

(21) Appl. No.: 15/182,040

(22) Filed: Jun. 14, 2016

(65) Prior Publication Data

US 2017/0036580 A1 Feb. 9, 2017

(30) Foreign Application Priority Data

Aug. 6, 2015 (JP) ................................. 2015-156260

(51) Int. Cl.
*B60N 2/68* (2006.01)
*B60N 2/42* (2006.01)
*B60N 2/427* (2006.01)

(52) U.S. Cl.
CPC ........... *B60N 2/686* (2013.01); *B60N 2/4228* (2013.01); *B60N 2/42709* (2013.01); *B60N 2/682* (2013.01)

(58) Field of Classification Search
CPC .. B60N 2/4228; B60N 2/42709; B60N 2/686; B60N 2/682
USPC ....................................... 297/216.14, 216.13
See application file for complete search history.

(56) References Cited

U.S. PATENT DOCUMENTS

| | | | |
|---|---|---|---|
| 3,802,737 A | 4/1974 | Mertens | |
| 6,074,004 A * | 6/2000 | Carmichael | B60N 2/4221 297/216.13 |
| 7,401,852 B2 * | 7/2008 | Humer | B60N 2/4228 297/216.1 |
| 8,864,228 B2 * | 10/2014 | Ishizaki | B60N 2/4221 297/216.14 |
| 2013/0134749 A1 | 5/2013 | Awata et al. | |
| 2014/0225352 A1 | 8/2014 | Awata et al. | |
| 2015/0108744 A1 | 4/2015 | Line et al. | |

FOREIGN PATENT DOCUMENTS

| | | |
|---|---|---|
| DE | 102 33 850 A1 | 2/2004 |
| JP | 2011-025871 A | 2/2011 |
| JP | 2012-035811 A | 2/2012 |
| JP | 2012-071627 A | 4/2012 |
| JP | 5459407 B2 | 4/2014 |

OTHER PUBLICATIONS

Jan. 5, 2017 Extended Search Report issued in European Patent Application No. 16175845.3.

* cited by examiner

Primary Examiner — David R Dunn
Assistant Examiner — Tania Abraham
(74) Attorney, Agent, or Firm — Oliff PLC

(57) ABSTRACT

A vehicle seat includes a seat back frame having a pair of side frames; a back panel main body constituted of resin and having a main wall and projections, the projections projecting away from the main wall to a seat width direction outer side; and back panel supports constituted of a resiliently deformable metal material and that each includes an attachment plate portion and a joining plate portion. The attachment plate portion is disposed along and is attached to a side wall portion of one of the pair of side frames, and the joining plate portion projects from an edge of the attachment plate portion toward the projection and is integrally joined to the projection.

12 Claims, 8 Drawing Sheets

VEHICLE SEAT

CROSS-REFERENCE TO RELATED APPLICATION

This application claims priority under 35 USC 119 from Japanese Patent Application No. 2015-156260 filed Aug. 6, 2015, the disclosure of which is incorporated by reference herein in its entirely.

BACKGROUND

Technical Field

Preferred embodiments relate to a vehicle seat.

Related Art

JPA No. 2012-035811 discloses a vehicle seat. In this vehicle seat, a seat back spring is structured by a back panel portion fabricated of resin. A support face at a seat back board that supports a vehicle occupant is structured by the back panel portion. That is, in JPA No. 2012-035811, the seat back spring that assures cushioning of the seat back and the seat back board that supports the vehicle occupant are structured integrally, which enables a reduction in thickness of the vehicle seat.

SUMMARY

However, in a vehicle with the vehicle seat described in JPA No. 2012-035811, if a load above a predetermined value is applied from a vehicle rear side at the time of a rear face collision (below referred to simply as a "rear collision") or the like, it is likely that a deformation amount of the back panel portion will be insufficient and that the vehicle occupant may experience discomfort.

In consideration of the above circumstances, an object of preferred embodiments is to provide a vehicle seat that may both enable reduced thickness and mitigate discomfort of a vehicle occupant that is caused by the application of a load from the vehicle rear in a rear collision or the like.

A vehicle seat of a first aspect of the disclosure includes: a seat back frame that has a left side frame and a right side frame and that structures a framework of a seat back, each of the left and right side frames respectively has a side wall portion that faces in a seat width direction; a back panel main body constituted of resin and that includes a main wall and projections, the main wall covering an area between the left and right side frames and being configured to support a vehicle occupant, each of the projections projecting away from the main wall portion to a seat width direction outer side; and back panel supports constituted of a resiliently deformable metal material and that each includes an attachment plate portion and a joining plate portion, the attachment plate portion being disposed along the side wall portion of either one of the left and right side frames and being attached to the side frame, the joining plate portion projecting from an edge of the attachment plate portion toward the projections and being integrally joined to one of the projections.

According to the first aspect, the framework of the seat back is structured by the seat back frame, and the seat back frame is equipped with the left and right side frames. An area between the left and right side frames of the seat back frame is covered by the main wall of the back panel main body that is fabricated of resin. Each of the projections of the back panel main body projects to the seat width direction outer side from the side at which the main wall is disposed. The back panel main body is fixed to the seat back frame by the projections being joined to the back panel supports that are attached to the side frames. Hence, a vehicle occupant is supported by the main wall of the back panel main body.

If both the back panel main body and the back panel supports were fabricated of resin, then if a load above a predetermined value was applied from the vehicle rear side during a rear collision or the like, it is likely that a deformation amount of the back panel main body and the back panel supports would be insufficient and that a vehicle occupant would experience discomfort.

In contrast, in the first aspect, each of the back panel supports includes the attachment plate portion and the joining plate portion and is constituted of the metal material that is capable of resilient deformation. The attachment plate portion is arranged along the side wall portion of the side frame that faces in the seat width direction, and is attached to the side frame. The joining plate portion projects from the edge of the attachment plate portion toward the projections of the back panel main body, and the joining plate portion is integrally joined to one of the projections. Therefore, if the seat back and a vehicle occupant act to move relatively due to the application of a load from the vehicle rear caused by a rear collision or the like, the joining plate portion of the back panel support deforms to bend about the attachment plate portion side thereof. Thus, the vehicle occupant sinks into the seat back toward the seat rear side. Moreover, a thickness of the seat back can be reduced compared to a structure in which a member that assures cushioning of the seat back and a member that supports a vehicle occupant are provided separately.

A vehicle seat of a second aspect of the disclosure includes the first aspect, wherein the attachment plate portion is disposed at the seat width direction outer side of the side wall portion of either of the left and right side frames, and the joining plate portion projects from the edge at a rear side of the attachment plate portion and is joined to the projection at the rear side of a rear wall portion of either one of the left and right side frames that faces to the vehicle rear side.

According to the second aspect, the attachment plate portion of each of the back panel supports is disposed at the side wall portion at the seat width direction outer side of either one of the left and right side frames. The joining plate portion of the back panel support projects from the edge at the rear side of the attachment plate portion, and is joined to the projection of the back panel main body at the rear side of the rear wall portion of either one of the left and right side frames that faces to the seat rear side. Consequently, a moment that is produced in the joining plate portion of the back panel support by the application of a load from the vehicle rear, due to a rear collision or the like, acts as a bending moment on the attachment plate portion of the back panel support and may deform the attachment plate portion to bend.

A vehicle seat of a third aspect of the disclosure further includes, in the first aspect or the second aspect, a covering fabricated of resin that covers the back panel supports from a rear face side of the seat back.

According to the third aspect, because each back panel support is covered from the rear face side of the seat back by the covering fabricated of resin, the back panel supports fabricated of metal cannot be contacted from the rear face side of the seat back.

In a vehicle seat of a fourth aspect of the disclosure included in the third aspect, the back panel main body is constituted of a composite material that includes resin and glass fibers, and the covering is resilient and is capable of deforming to follow the back panel supports.

According to the fourth aspect, the back panel main body is constituted of the composite material including resin and glass fibers. Thus, compared to a structure in which the back panel main body is constituted only of resin, deformation of the back panel main body by the application of a load from the vehicle rear due to a rear collision or the like is suppressed. Moreover, because the covering is resilient and is capable of deforming to follow deformation of the back panel support, the covering does not obstruct deformation of the back panel support even if the back panel support is greatly deformed.

In a vehicle seat of a fifth aspect of the disclosure included in any of the first to fourth aspects, a thickness of the projections increases from the seat width direction inner side toward an outer side thereof where a distal end of the joining plate portion of the back panel supports is disposed.

According to the fifth aspect, the thickness of each projection of the back panel main body increases from the seat width direction inner side toward the outer side thereof where the distal end side of the joining plate portion of the back panel support is disposed. Therefore, when a load is applied from the vehicle rear due to a rear collision or the like, a concentration of stress at a boundary portion between the projections and the joining plate portion is suppressed.

As described above, a vehicle seat according to the first aspect has excellent effects both in that a reduction in thickness may be enabled and in that discomfort of an occupant caused by the application of a load from the vehicle rear in a rear collision or the like may be reduced.

A vehicle seat according to the second aspect has excellent effects both in that complexity of the structure of the back panel support may be avoided and in that cushioning of the seat back may be further improved.

A vehicle seat according to the third aspect has excellent effects in that contact between an assembly worker and edge portions of the back panel supports during assembly and in that contact between a skin of the seat back and the edge portions may be inhibited.

A vehicle seat according to the fourth aspect has excellent effects in that a load applied from the vehicle rear in a rear collision or the like is concentrated at the resiliently deformable back panel supports and in that concentration of the applied load at the back panel main body supporting a vehicle occupant may be suppressed.

A vehicle seat according to the fifth aspect has excellent effects both in that an increase in weight of the back panel main body may be suppressed and in that a load may be smoothly transmitted from the back panel main body to the back panel supports.

BRIEF DESCRIPTION OF THE DRAWINGS

Preferred embodiments will be described in detail based on the following figures, wherein.

DETAILED DESCRIPTION

Figure 1:
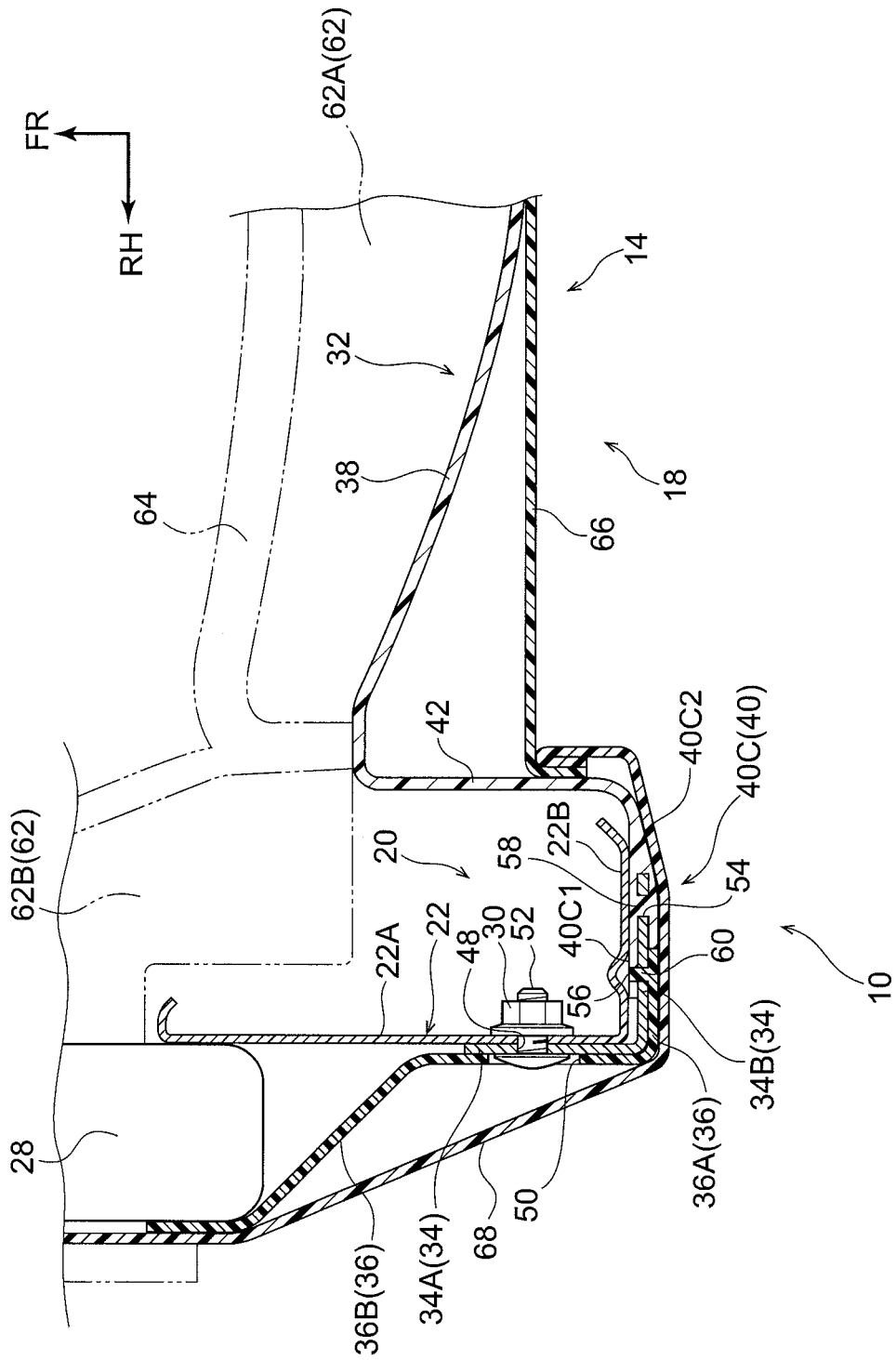
FIG. 1 is a magnified sectional diagram (a magnified sectional diagram showing a portion of FIG. 2), viewed from a seat lower side, showing structures of a vehicle seat in accordance with a present exemplary embodiment.

Herebelow, an exemplary embodiment of a vehicle seat is described using FIG. 1 to FIG. 8. The arrow FR, arrow UP and arrow RH that are shown in the drawings represent, respectively, a forward direction, an upward direction and a rightward direction of the vehicle seat 10. In the present exemplary embodiment, the forward direction, upward direction and rightward direction of the vehicle seat 10 coincide with the forward direction, upward direction and rightward direction of a vehicle in which the vehicle seat 10 is installed.

Figure 7:
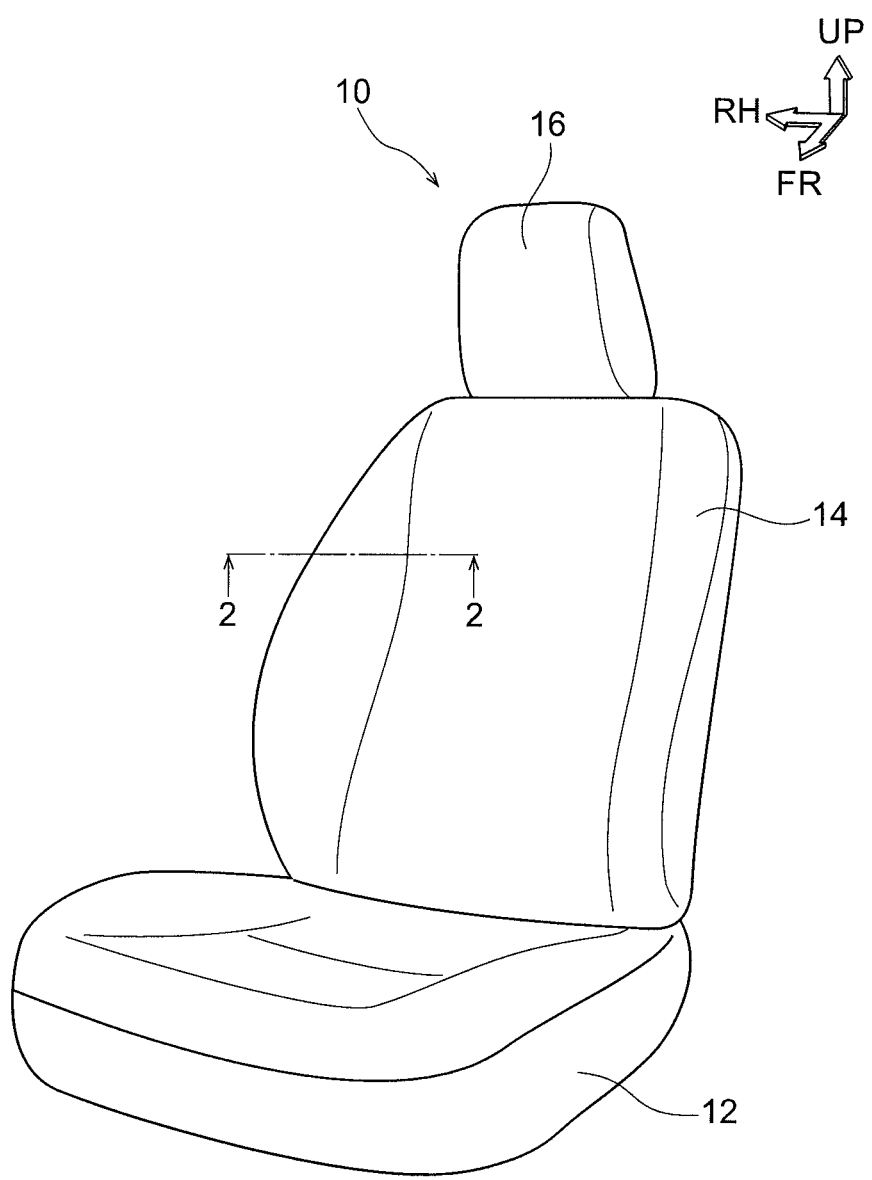
FIG. 7 is a perspective view, viewed diagonally from the front side, of the vehicle seat in accordance with the present exemplary embodiment.

First, overall structure of the vehicle seat 10 according to the exemplary embodiment is described. As shown in FIG. 7, the vehicle seat 10 is a front seat that is installed at the front side of a vehicle cabin interior. The vehicle seat 10 includes a seat cushion 12 that supports the buttocks area and thigh area of a vehicle occupant, a seat back 14 that supports the back area of the vehicle occupant, and a headrest 16 that supports the head area of the vehicle occupant.

Figure 2:
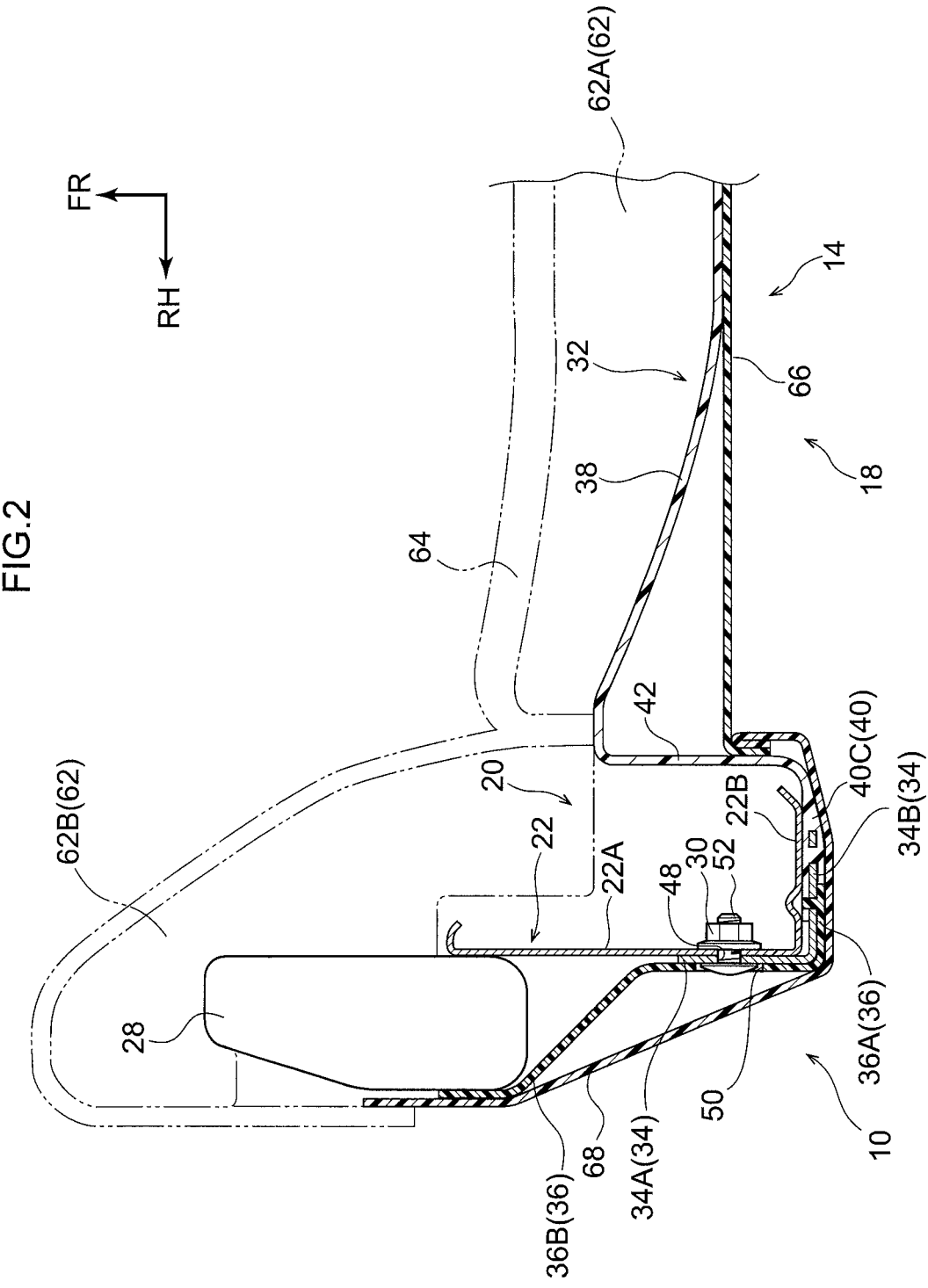
FIG. 2 is a sectional diagram (a sectional diagram showing a state cut along line 2-2 in FIG. 7), viewed from the seat lower side, showing structures of the vehicle seat in accordance with the present exemplary embodiment.
Figure 6:
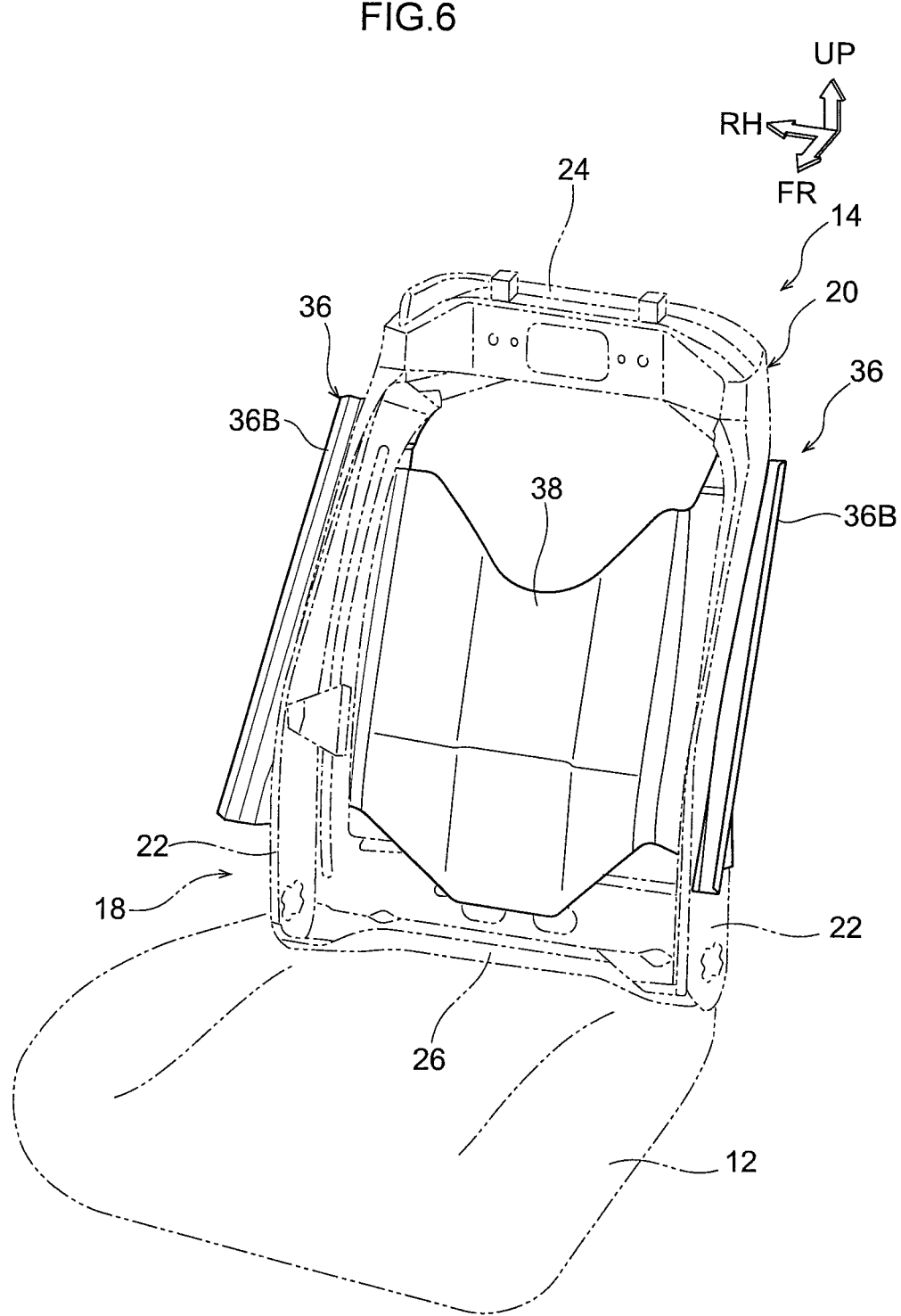
FIG. 6 is a perspective diagram, viewed diagonally from the front side, showing relationships between a seat back frame and the seat back panel of the vehicle seat in accordance with the present exemplary embodiment.

The headrest 16 is supported at a seat upper side end portion of the seat back 14 to be movable up and down. The seat back 14 is supported at a seat rear side end portion of the seat cushion 12 to be tiltable. As shown in FIG. 2 and FIG. 6, the seat back 14 includes a seat back frame 20 and a seat back panel 18. The seat back frame 20 structures a framework of the seat back 14. The seat back panel 18, which is described below, is attached to the seat back frame 20 and structures principal portions of a present exemplary embodiment.

The seat back frame 20 includes a left and right pair of side frames 22, an upper frame 24 and a lower frame 26. The side frames 22 structure regions at seat width direction outer sides of the seat back frame 20. The upper frame 24 structures a region at the seat upper side of the seat back frame 20. The lower frame 26 structures a region at the seat lower side of the seat back frame 20. Each side frame 22 is disposed with a length direction thereof in the seat up-and-down direction. The upper frame 24 spans between seat upper side end portions of the side frames 22, and the lower frame 26 spans between seat lower side end portions of the side frames 22. Thus, the seat back frame 20 is structured in a rectangular frame shape as viewed from the seat front side.

In the present exemplary embodiment, the members structuring the seat back frame 20 are all fabricated by press-forming, but alternative frame constructions may be employed. For example, various constructions in which the upper frame 24 and the lower frame 26 are structured by pipe members or the like may be employed.

Now, structures of the side frames 22 are described in detail. The vehicle seat 10 according to the present exemplary embodiment is basically structured with left-right symmetry. Accordingly, a region at the seat width direction right side of the vehicle seat 10 is described in detail below and descriptions of a region of the seat width direction left side of the vehicle seat 10 are appropriately omitted.

Each side frame 22 is structured in an "L" shape as seen in plan view (from above), including a side wall portion 22A and a rear wall portion 22B. The side wall portion 22A extends in the seat up-and-down direction with a thickness direction thereof in the seat width direction. The rear wall portion 22B projects to the seat width direction inner side from a periphery edge at the seat rear side of the side wall portion 22A. More specifically, a breadth of the side wall portion 22A in the seat front-and-rear direction increases from the seat upper side toward the seat lower side, and a periphery edge at the seat front side and a periphery edge at the seat rear side of the side frame 22 are structured in curve shapes that protrude toward the seat front side. In addition, a surface of the rear wall portion 22B of the side frame 22 is formed in a curved shape that protrudes to the vehicle front side as seen in the seat width direction. A side airbag module 28 is disposed at a seat front side end portion of the side wall portion 22A. Weld nuts 30 that are used for attachment of the seat back panel 18 are provided at a face at the seat width direction inner side of the side wall portion 22A.

Below, an example of the structure of the seat back panel 18 is described in detail.

Figure 3:
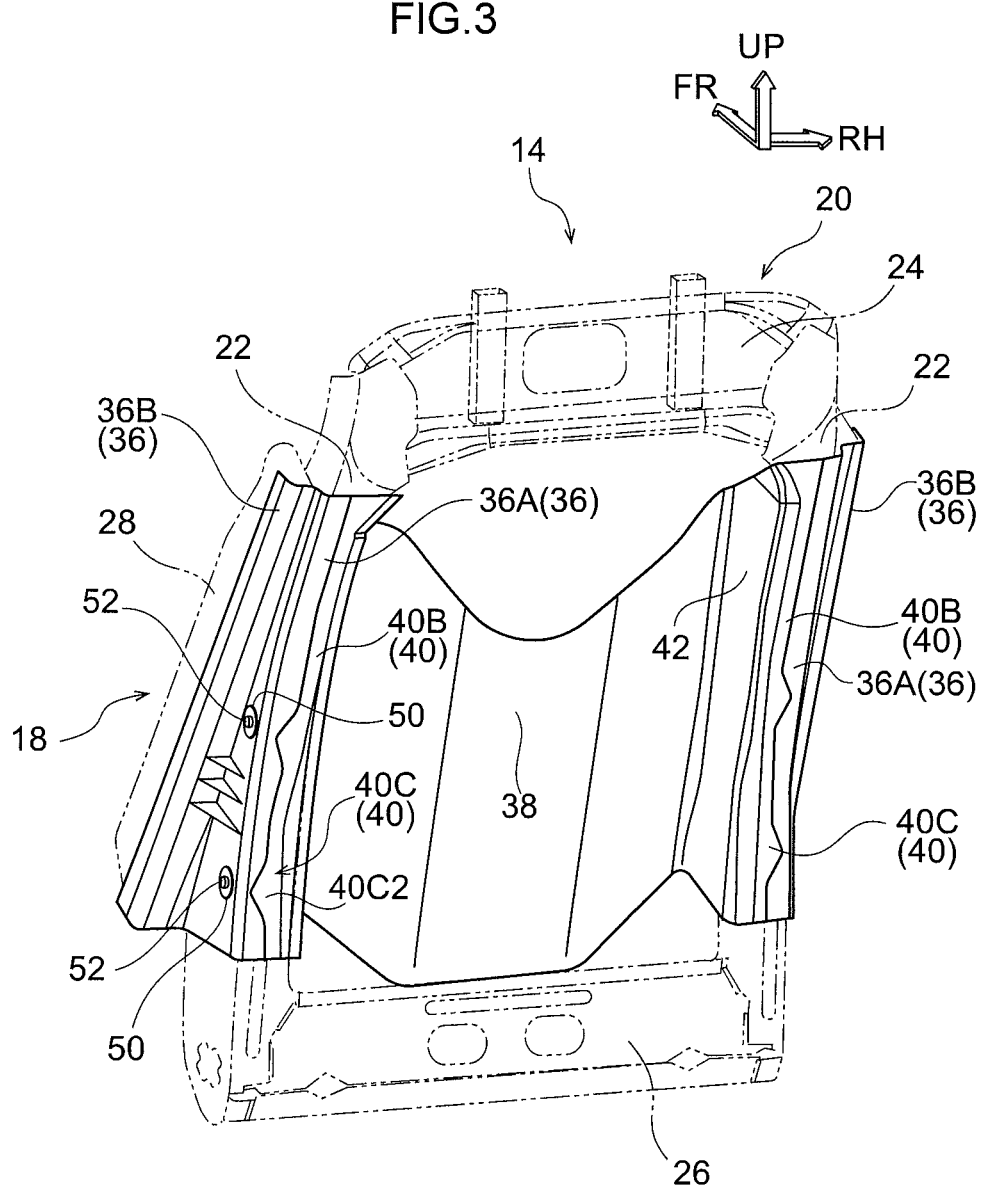
FIG. 3 is a perspective diagram, viewed diagonally from the rear side, of a seat back panel of the vehicle seat in accordance with the present exemplary embodiment.
Figure 5:
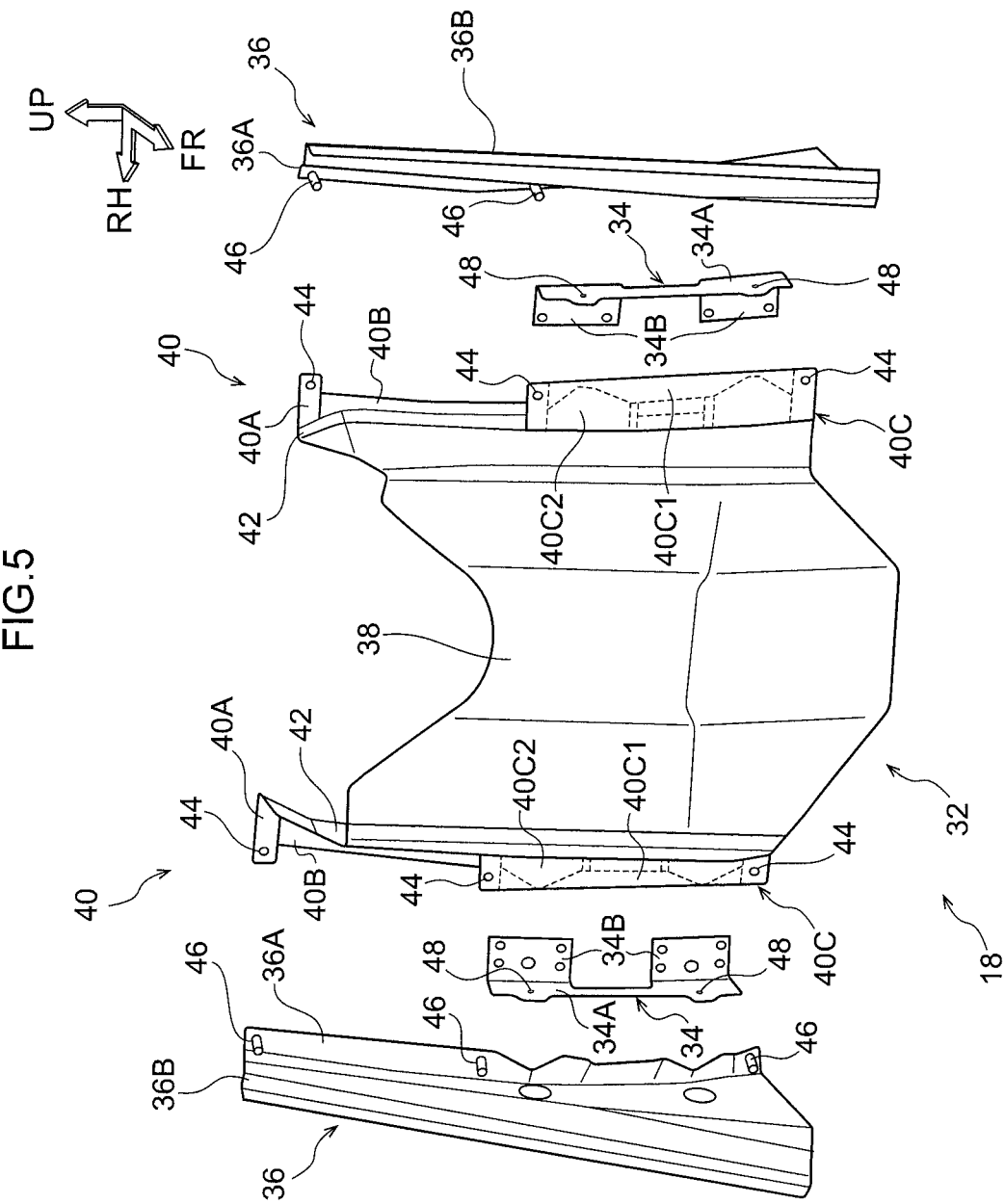
FIG. 5 is an exploded perspective diagram showing structures of the seat back panel of the vehicle seat in accordance with the present exemplary embodiment.

As shown in FIG. 2, FIG. 3 and FIG. 5, the seat back panel 18 is a structure in which a back panel main body portion 32, a pair of back panel support portions 34 and a pair of side protectors 36 are integrally formed. The back panel main body portion 32 is fabricated of resin and the back panel support portions 34 are fabricated of a resiliently deformable metal. The side protectors 36 serve as covering portions that are fabricated of resin. Because the back panel main body portion 32 and the side protectors 36 are integrally formed, there are regions in which boundaries therebetween are indeterminate. Outlines of the back panel main body portion 32 and the side protectors 36 are shown in FIG. 5 for convenience of description.

The back panel main body portion 32 includes a main wall portion 38, projecting wall portions 40 and vertical wall portions 42. The main wall portion 38 is a principal structure of the back panel main body portion 32. The projecting wall portions 40 structure regions at the seat width direction outer sides of the back panel main body portion 32. The vertical wall portions 42 span between the main wall portion 38 and the projecting wall portions 40. The back panel main body portion 32 is constituted of, for example, a composite material in which polypropylene contains glass fibers at 30% by weight.

More specifically, the main wall portion 38 extends in the seat up-and-down direction and in the seat width direction, and covers an area between the left and right pair of side frames 22. The main wall portion 38 is structured in a shape that is provided, at an upper region of the main wall portion 38, with a portion lying along a curve that protrudes to the seat rear side as seen in a plan view and is provided, at a lower region of the main wall portion 38, with a portion lying along a curve that protrudes to the seat front side as seen in a vertical sectional view. A periphery edge at the seat upper side of the main wall portion 38 is formed in a "U" shape that decreases in width toward the seat lower side. A periphery edge at the seat lower side of the main wall portion 38 is formed in a trapezoid shape that decreases in width toward the seat lower side.

Each of the vertical wall portions 42 is provided along periphery edges at a seat width direction outer side of the main wall portion 38, projects toward the seat rear side from the periphery edges, and is formed in a plate shape whose plate thickness direction is in the seat width direction.

Each of the projecting wall portions 40 is provided along periphery edges at the seat rear side of the vertical wall portions 42 and projects to the seat width direction outer side from the periphery edges. Each of the projecting wall portions 40 is formed in a plate shape whose plate thickness direction is in the seat front-and-rear direction. Each of the projecting wall portions 40 includes, in the seat up-and-down direction, a joining portion 40A, a general portion 40B and a projection portion 40C. The joining portion 40A is joined to the side protector 36, the general portion 40B is adjacent to the side protector 36, and the projection portion 40C is joined to the side protector 36 and the back panel support portion 34.

More specifically, the joining portion 40A structures an end portion at the seat upper side of the projecting wall portion 40, and is structured in a rectangular plate shape whose length direction is in the seat width direction. As described below, a joined portion 44, to which the side protector 36 is joined, is formed at a distal end portion of the joining portion 40A. The general portion 40B is formed in a rectangular plate shape that extends from a periphery edge at the seat lower side of the joining portion 40A to a seat up-and-down direction middle portion of the projecting wall portion 40. The below-described side protector 36 is disposed at the seat width direction outer side of the general portion 40B. The projection portion 40C extends from a lower end portion of the general portion 40B to an end portion at the seat lower side of the projecting wall portion 40. The projection portion 40C is formed in a rectangular plate shape that is widened relative to the general portion 40B. In a state in which the seat back panel 18 has been molded, a portion at the seat rear side and at the seat width direction outer side of the projection portion 40C is made thinner than other portions thereof. To be specific, a region at the seat width direction outer side of the projection portion 40C is formed as a reduced thickness portion 40C1, and a region at the seat width direction inner side of the projection portion 40C is formed as an increased thickness portion 40C2, the seat width direction outer side of which is formed in a zigzag shape as seen from the seat rear side. As described below, in the state in which the seat back panel 18 has been molded, the back panel support portion 34 can be fitted into the projection portion 40C. In addition, a joined portion 44 is formed at the seat width direction outer side of both end portions in the seat up-and-down direction of the projection portion 40C, similarly to the joined portion 44 that is formed at the joining portion 40A.

Now, the structure of each side protector 36 is described. The side protector 36 is disposed with a length direction thereof in the seat up-and-down direction, and includes a rear side wall portion 36A and an outer side wall portion 36B. A plate thickness direction of the rear side wall portion 36A is in the seat front-and-rear direction. The outer side wall portion 36B projects to the seat front side from a periphery edge at the seat width direction outer side of the rear side wall portion 36A. The side protector 36 is constituted of, for example, polypropylene.

More specifically, the rear side wall portion 36A is disposed along the rear wall portion 22B of the side frame 22, at the seat rear side of the rear wall portion 22B, in a state in which a joining plate portion 34B of the back panel support portion 34, which is described below, is interposed between the rear side wall portion 36A and the rear wall portion 22B. A region at the seat lower side and at the seat width direction inner side of a periphery edge portion of the rear side wall portion 36A is formed in a zigzag shape that corresponds with the shape of the outer side of the increased thickness portion 40C2 of the projection portion 40C. Anchor portions 46 protrude from seat up-and-down direction both end portions and a seat up-and-down direction middle portion of the rear side wall portion 36A. In the state in which the seat back panel 18 has been molded, the anchor portions 46 are joined to the joined portions 44 formed at the projecting wall portion 40. In the state in which the anchor portions 46 have been joined to the joined portions 44, the resin constituting the back panel main body portion 32 and the resin constituting the side protector 36 are mixed together at boundary portions therebetween.

Meanwhile, a region at the seat rear side of the outer side wall portion 36B is disposed along the side wall portion 22A of the side frame 22, at the seat width direction outer side of the side wall portion 22A, in a state in which an attachment plate portion 34A of the back panel support portion 34, which is described below, is interposed between the outer side wall portion 36B and the side wall portion 22. A region at the seat front side of the outer side wall portion 36B projects so as to spread to the seat width direction outer side in plan view and covers the side airbag module 28 from the seat rear side thereof.

Figure 4:
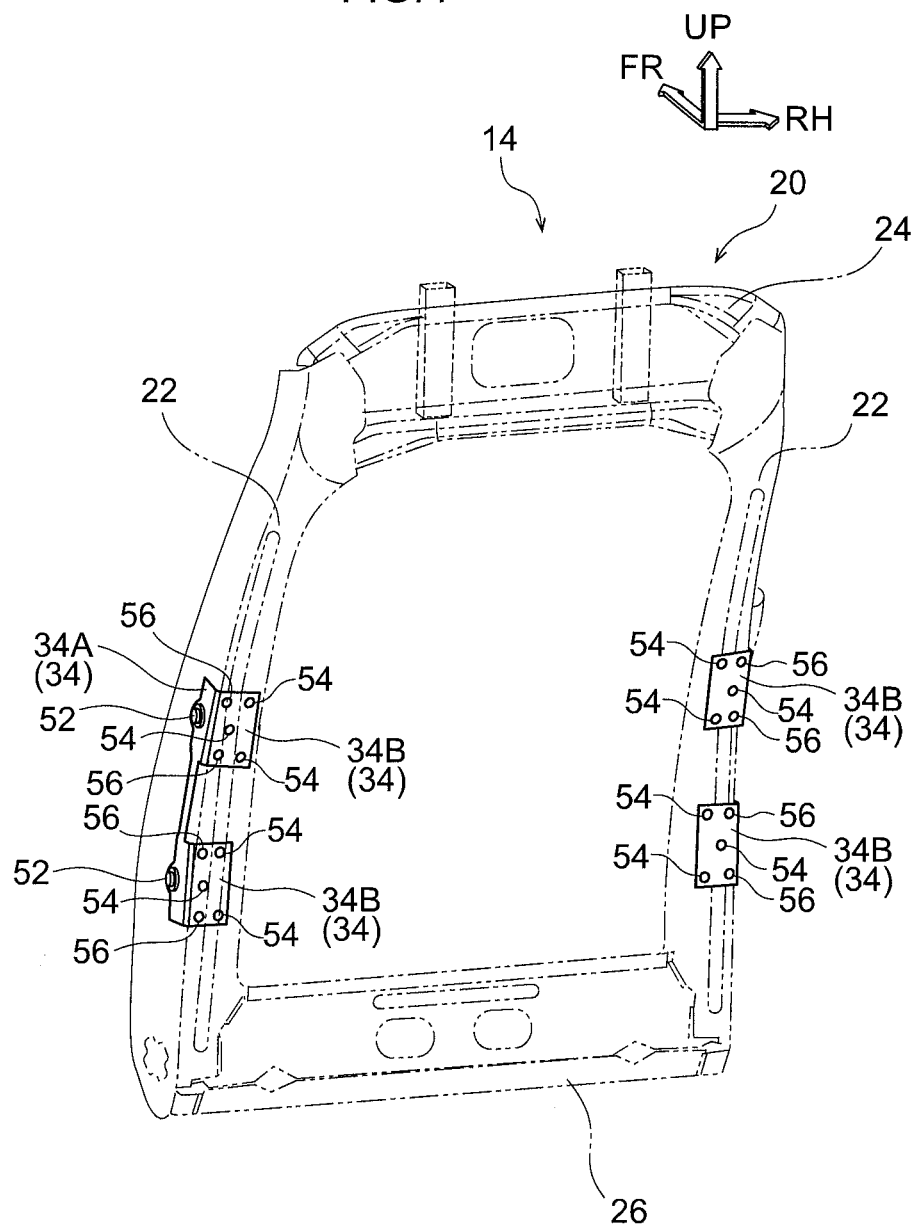
FIG. 4 is a perspective diagram, viewed diagonally from the rear side, of back panel support portions of the seat back panel of the vehicle seat in accordance with the present exemplary embodiment.

Now, the structure of each back panel support portion 34 is described, principally using FIG. 2, FIG. 4 and FIG. 5. Each back panel support portion 34 includes the attachment plate portion 34A, which is disposed along a face at the seat width direction outer side of the side wall portion 22A of the side frame 22, and an upper and lower pair of the joining plate portion 34B, which project to the seat width direction inner side from a periphery edge at the seat rear side of the attachment plate portion 34A. The back panel support portion 34 is constituted of a plate member fabricated of tempered steel.

More specifically, the attachment plate portion 34A is formed in a rectangular shape that extends in the seat up-and-down direction and of which a length direction middle portion curves so as to protrude to the seat front side, as seen in the seat width direction. Insertion portions 48 are formed in the attachment plate portion 34A, spaced up and down in the length direction. The insertion portions 48 correspond with the weld nuts 30 at the side frame 22. In the state in which the seat back panel 18 has been molded, the attachment plate portion 34A surface contacts with the outer side wall portion 36B of the side protector 36 from the seat width direction inner side thereof. Insertion portions 50 are formed at the outer side wall portion 36B. Bolts 52 (fasteners) are screwed into the weld nuts 30 from the seat width direction outer side of the outer side wall portion 36B. Thus, the back panel support portion 34 is attached to the seat back frame 20.

Each of the joining plate portions 34B is structured in a rectangular shape whose length direction is in the up-and-down direction along the side frame 22. Each of the joining plate portions 34B is disposed along a face at the seat rear side of the rear wall portion 22B of the side frame 22. Penetrating portions 54 and 56 (holes) are provided in the joining plate portion 34B, the penetrating portions 54 are used for joining the joining plate portion 34B to the back panel main body portion 32 and the penetrating portions 56 are used for joining the joining plate portion 34B to both the back panel main body portion 32 and the side protector 36. More specifically, five penetrating portions 54, 56 are provided in each of the joining plate portion 34B, three of which are arranged in a row in the length direction and at the seat width direction outer side of the joining plate portion 34B. Of these three penetrating portions, the penetrating portions that are at the seat upper side and the seat lower side are the penetrating portions 56. All the other penetrating portions are the penetrating portions 54.

In the present exemplary embodiment, as shown in FIG. 1, a portion of the joining plate portion 34B is buried in the increased thickness portion 40C2 of the projection portion 40C of the back panel main body portion 32 in the state in which the seat back panel 18 has been molded. Specifically, the resin that constitutes the projection portion 40C is disposed into the penetrating portions 54, forming anchor portions 58 that join the back panel main body portion 32 to the back panel support portion 34. That is, the joining plate portions 34B and the projection portion 40C are integrally joined at the seat rear side of the rear wall portion 22B of the side frame 22. In addition, a thickness of the projection portion 40C increases from the seat width direction inner side thereof toward a distal end portion of the joining plate portion 34B.

Meanwhile, at the side of the projection portion 40C at which the reduced thickness portion 40C1 is provided, the reduced thickness portion 40C1, the joining plate portion 34B and the rear side wall portion 36A of the side protector 36 are disposed in this order from the seat front side. The resin that constitutes the back panel main body portion 32 and the resin that constitutes the side protector 36 flow into the penetrating portions 56, forming anchor portions 60 that join the back panel main body portion 32, the back panel support portion 34 and the side protector 36.

A seat pad 62 is disposed at the seat front side of the seat back frame 20 and the seat back panel 18. The seat front side of the back panel main body portion 32 is covered by a pad middle portion 62A that structures a middle portion of the seat pad 62. The seat front sides of the side frames 22 are covered by pad side portions 62B that structure the seat width direction outer sides of the seat pad 62. The seat front side of the seat pad 62 is covered by a skin 64.

The seat rear side of the back panel main body portion 32 is covered by a rear portion middle skin 66, and the seat rear sides of the side frames 22 are covered by rear portion side skins 68. Each rear portion side skin 68 is disposed along the back panel main body portion 32 and side protector 36 that are constituted of resin but is not in contact with the back panel support portion 34 that is a metal member.

Operation and Effects of the Present Exemplary Embodiment

Now, operation and effects of the present exemplary embodiment are described.

In the present exemplary embodiment, as shown in FIG. 1, the framework of the seat back 14 is structured by the seat back frame 20, and the seat back frame 20 is provided with the left and right pair of side frames 22. The area between the left and right pair of side frames 22 of the seat back frame 20 is covered by the main wall portion 38 of the back panel main body portion 32 that is fabricated of resin. Each of the projection portions 40C projecting to a seat width direction outer side from the main wall portion 38 is joined to the back panel support portion 34 that is attached to the side frame 22. Thus, the back panel main body portion 32 is fixed to the seat back frames 20 via the back panel support portions 34. Consequently, a vehicle occupant may be supported by the main wall portion 38 of the back panel main body portion 32.

In a case that the back panel main body portion 32 and the back panel support portion 34 were both fabricated of resin, then if a load above a predetermined value was applied from the vehicle rear side at the time of a rear collision or the like, it is likely that a deformation amount of the back panel main body portion 32 and the back panel support portion 34 would be insufficient and that the vehicle occupant would experience discomfort.

Figure 8:
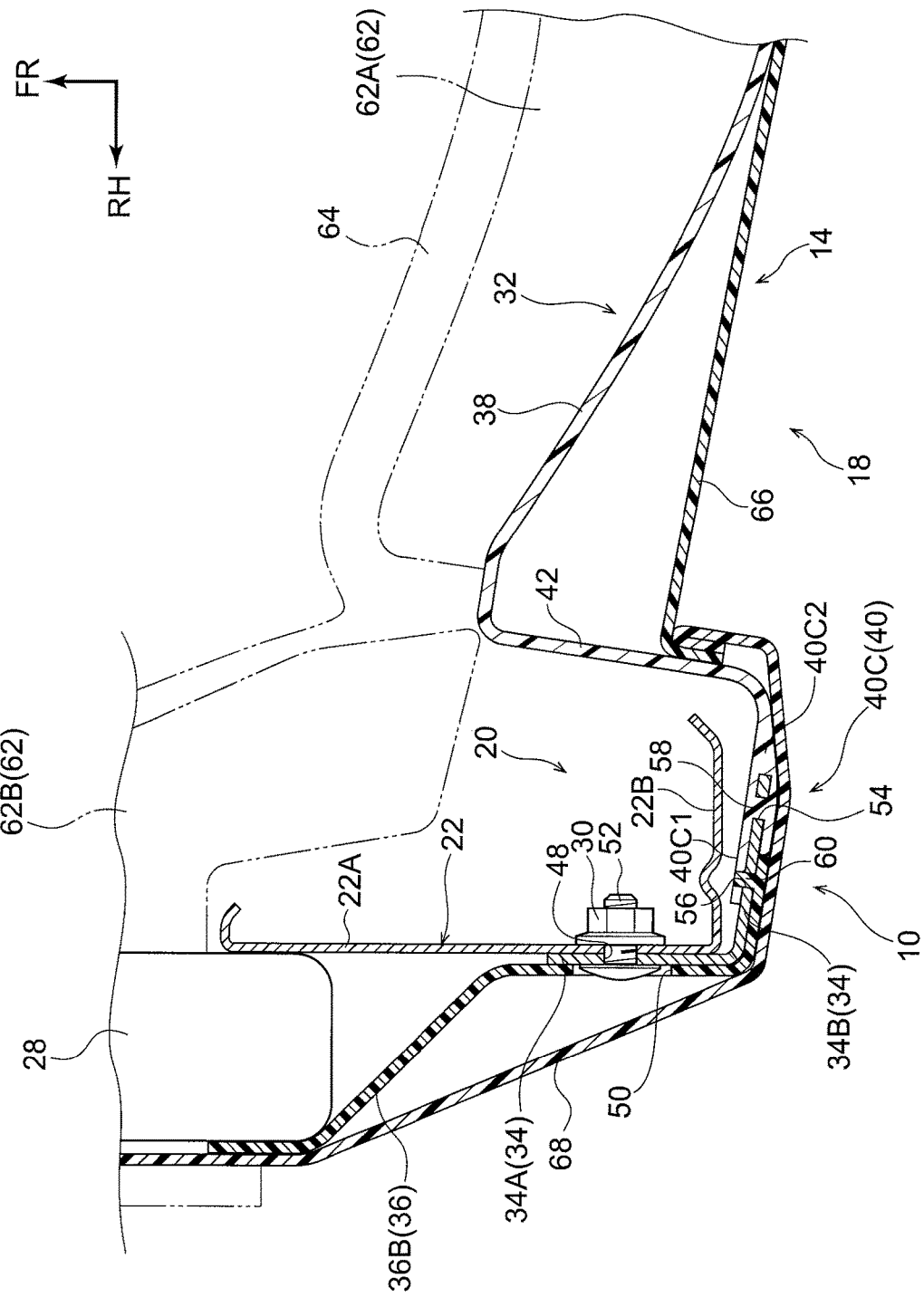
FIG. 8 is a magnified sectional diagram (a magnified sectional diagram corresponding to FIG. 1), viewed from the seat lower side, showing an action of the vehicle seat in accordance with the present exemplary embodiment during a rear collision.

In contrast, in the present exemplary embodiment, each of the back panel support portions 34 includes the attachment plate portion 34A and the joining plate portion 34B and is made of the resiliently deformable metal material. The attachment plate portion 34A is disposed along the side wall portion 22A of the side frame 22 that faces in the seat width direction, and is attached to the side frame 22. The joining plate portion 34B projects from the periphery edge of the attachment plate portion 34A to the side at which the projection portion 40C of the back panel main body portion 32 is disposed, and the joining plate portion 34B is integrally joined to the projection portion 40C. Therefore, if the seat back 14 and the vehicle occupant act to relatively move toward the vehicle rear due to the application of a load from the vehicle rear by a rear collision or the like, as shown in FIG. 8, the joining plate portion 34B of the back panel support portion 34 deforms to bend about the side thereof at which the attachment plate portion 34A is provided (the boundary portion between the joining plate portion 34B and the attachment plate portion 34A). As a result, the vehicle occupant may sink into the seat back 14 toward the seat rear side. Moreover, the thickness of the seat back 14 may be reduced compared to a structure in which a member that assures cushioning of the seat back 14 and a member that supports the vehicle occupant are provided separately. Therefore, the vehicle seat 10 according to the present exemplary embodiment may both enable a reduction in thickness of the seat back 14 and mitigate discomfort of a vehicle occupant caused by the application of a load from the vehicle rear at the time of a rear collision or the like.

In the present exemplary embodiment, the attachment plate portion 34A of each back panel support portion 34 is disposed at the side wall portion 22A at the seat width direction outer side of the side frame 22. The joining plate portion 34B of the back panel support portion 34 projects from the periphery edge at the seat rear side of the attachment plate portion 34A, and is joined to the projection portion 40C of the back panel main body portion 32 at the seat rear side of the rear wall portion 22B of the side frame 22 that faces to the seat rear side. Therefore, a moment that is produced in the joining plate portion 34B of the back panel support portion 34 by the application of a load from the vehicle rear by a rear collision or the like may act as a bending moment on the attachment plate portion 34A of the back panel support portion 34 and may deform the attachment plate portion 34A to bend. As a result, in the present exemplary embodiment, both an increase in complexity of the structure of the back panel support portion 34 may be suppressed and cushioning of the seat back 14 may be further improved.

In the present exemplary embodiment, because each back panel support portion 34 is covered from the rear face side of the seat back 14 by the side protector 36 fabricated of resin, the back panel support portion 34 fabricated of metal is not contacted from the rear face side of the seat back 14. As a result, in the present exemplary embodiment, contact between an assembly worker and edge portions of the back panel support portions 34 during assembly and contact between the rear portion side skins 68 of the seat back 14 and the edge portions may be inhibited.

In the present exemplary embodiment, the back panel main body portion 32 is constituted of a composite material including resin and glass fibers. Thus, compared to a structure in which the back panel main body portion 32 is constituted of resin alone, deformation of the back panel main body portion 32 by the application of a load from the vehicle rear due to a rear collision or the like is suppressed. Because each side protector 36 is resilient and is capable of deforming to follow the back panel support portion 34, the side protector 36 does not obstruct deformation of the back panel support portion 34 even if the back panel support portion 34 is greatly deformed. As a result, a load applied from the vehicle rear in a rear collision or the like can be concentrated at the resiliently deformable back panel support portions 34 and a concentration of the applied load at the back panel main body portion 32 supporting the vehicle occupant may be suppressed.

Furthermore, in the present exemplary embodiment, the thickness of the projection portion 40C of the back panel main body portion 32 increases from the seat width direction inner side toward the outer side thereof where the distal end portion of the joining plate portion 34B of the back panel support portion 34 is disposed. Therefore, when a load is applied from the vehicle rear due to a rear collision or the like, a concentration of stress at a boundary portion between the projection portion 40C and the joining plate portion 34B may be suppressed. As a result, in the present exemplary embodiment, an increase in weight of the back panel main body portion 32 may be suppressed and the load may be smoothly transmitted from the back panel main body portion 32 to the back panel support portions 34.

Supplementary Descriptions of the Above Exemplary Embodiment (1) In the exemplary embodiment described above, the back panel main body portion 32, back panel support portions 34 and side protectors 36 structuring the seat back panel 18 are integrally formed. However, the side protectors 36 may be structured as separate bodies.

(2) In the exemplary embodiment described above, the seat width direction outer side of each side frame 22 is structured by the side wall portion 22A and the back panel support portion 34 is attached to the side wall portion 22A, but this is not limiting. Depending on the structure of the vehicle seat 10, structures are possible in which the seat width direction inner side of the side frame 22 is structured by the side wall portion 22A and the back panel support portion 34 is attached to this side wall portion 22A. That is, structures in which the back panel support portion 34 is attached to the seat width direction inner side of the side frame 22 are encompassed. In this case, a configuration is possible in which the back panel support portion 34 has a structure in which the joining plate portion 34B projects from a periphery edge at the seat front side of the attachment plate portion 34A, and the vertical wall portion 42 of the back panel main body portion 32 is omitted.

What is claimed is:

1. A vehicle seat comprising:
a seat back frame that has a left side frame and a right side frame and that structures a framework of a seat back, each of the left and right side frames respectively having a side wall portion that faces in a seat width direction;
a back panel main body constituted of resin and that includes a main wall and projections, the main wall covering an area between the left and right side frames and being configured to support a vehicle occupant, each of the projections projecting away from the main wall to a seat width direction outer side; and
back panel supports constituted of a resiliently deformable metal material and that each includes an attachment plate portion and a joining plate portion, the attachment plate portion being disposed along the side wall portion of either one of the left and right side frames and being attached to the side frame, the joining plate portion projecting from an edge of the attachment plate portion toward the projections of the back panel main body and being integrally joined to one of the projections so that the joining plate portion does not move relative to the one of the projections.

2. The vehicle seat according to claim 1, wherein
the attachment plate portion is disposed at the seat width direction outer side of the side wall portion of either of the left and right side frames, and
the joining plate portion projects from the edge at a rear side of the attachment plate portion and is joined to the one of the projections at the rear side of a rear wall portion of either one of the left and right side frames that faces to the vehicle rear side.

3. The vehicle seat according to claim 1, further comprising a covering fabricated of resin that covers the back panel supports from a rear face side of the seat back.

4. The vehicle seat according to claim 3, wherein
the back panel main body is constituted of a composite material that includes resin and glass fibers, and
the covering is resilient and is capable of deforming to follow the back panel supports.

5. The vehicle seat according to claim 1, wherein a thickness of the projections increases from the seat width direction inner side toward an outer side thereof where a distal end of the joining plate portion of the back panel supports is disposed.

6. The vehicle seat according to claim 1, wherein the joining plate portion is fixed to the one of the projections so that the joining plate portion does not move relative to the one of the projections at a fixing location at which the joining plate portion is fixed to the one of the projections.

7. A vehicle seat comprising:
a seat back frame including a left side frame member and a right side frame member, each of the left and right side frame members having a side wall portion that extends vertically and faces in a seat width direction;
a back panel main body constituted of resin and including a main wall, a left projection and a right projection respectively projecting toward a seat width direction outer side of left and right sides of the main wall; and
left and right back panel supports, each of the left and right back panel supports (i) is constituted of a resiliently deformable metal material, including (ii) an attachment plate portion and (iii) a joining plate portion, wherein
the attachment plate portion of the left back panel support is disposed along and attached to the side wall portion of the left side frame member, and the joining plate portion of the left back panel support projects from the attachment plate portion of the left back panel support toward the left projection of the back panel main body and is integrally joined to the left projection so that the joining plate portion of the left back panel support does not move relative to the left projection, and
the attachment plate portion of the right back panel support is disposed along and attached to the side wall portion of the right side frame member, and the joining plate portion of the right back panel support projects from the attachment plate portion of the right back panel support toward the right projection of the back panel main body and is integrally joined to the right projection so that the joining plate portion of the right back panel support does not move relative to the right projection.

8. The vehicle seat according to claim 7, wherein
the attachment plate portions of the left and right back panel supports are respectively disposed at the seat width direction outer sides of the side wall portions of the left and right side frame members, and
the joining plate portions of the left and right back panel supports respectively project from the edge at a rear side of the attachment plate portions of the left and right back panel supports and are joined to the respective left and right projection at the rear side of a rear wall portion of the left and right side frame members that faces to the vehicle rear side.

9. The vehicle seat according to claim 7, further comprising a covering fabricated of resin that covers the left and right back panel supports from a rear face side of the vehicle seat.

10. The vehicle seat according to claim 9, wherein
the back panel main body is constituted of a composite material that includes resin and glass fibers, and
the covering is resilient and is capable of deforming to follow the left and right back panel supports.

11. The vehicle seat according to claim 7, wherein a thickness of the left and right projections increases from the seat width direction inner side toward an outer side thereof where a distal end of the joining plate portions of the left and right back panel supports are disposed.

12. The vehicle seat according to claim 7, wherein
the joining plate portion of the left back panel support is fixed to the left projection so that the joining plate portion of the left back panel support does not move relative to the left projection at a fixing location at which the joining plate portion of the left back panel support is fixed to the left projection, and
the joining plate portion of the right back panel support is fixed to the right projection so that the joining plate portion of the right back panel support does not move relative to the right projection at a fixing location at which the joining plate portion of the right back panel support is fixed to the right projection.

* * * * *